United States Patent [19]

Coleman

[11] 4,340,574

[45] Jul. 20, 1982

[54] PROCESS FOR THE PRODUCTION OF ULTRAHIGH PURITY SILANE WITH RECYCLE FROM SEPARATION COLUMNS

[75] Inventor: Larry M. Coleman, Tonawanda, N.Y.

[73] Assignee: Union Carbide Corporation, New York, N.Y.

[21] Appl. No.: 182,148

[22] Filed: Aug. 28, 1980

[51] Int. Cl.$^3$ ............................................. C01B 33/04
[52] U.S. Cl. ..................................... 423/347; 203/4; 203/71; 203/DIG. 6; 423/341; 423/342; 423/349
[58] Field of Search ............... 423/341, 342, 347, 349; 203/4, 71, DIG. 6

[56] References Cited

U.S. PATENT DOCUMENTS

| | | | |
|---|---|---|---|
| 1,957,818 | 5/1934 | Carney | 196/11 |
| 2,450,415 | 10/1948 | Benning | 202/51 |
| 3,031,268 | 4/1962 | Shoemaker | 423/347 |
| 3,041,141 | 6/1962 | Shoemaker et al. | 423/347 |
| 3,156,630 | 11/1964 | Fahnoe et al. | 202/57 |
| 3,418,338 | 2/1966 | Gilman et al. | 260/348 |
| 3,421,984 | 1/1969 | Jensen et al. | 203/4 X |
| 3,445,345 | 5/1969 | Katzen et al. | 203/25 |
| 3,619,407 | 11/1971 | Hendricks et al. | 203/4 X |
| 3,968,199 | 7/1976 | Bakay | 423/347 |
| 4,113,845 | 9/1978 | Litteral | 423/347 X |

FOREIGN PATENT DOCUMENTS 1160412 1/1964 Fed. Rep. of Germany ...... 423/341

*Primary Examiner*—Jack Cooper
*Attorney, Agent, or Firm*—Frederick J. McCarthy, Jr.

[57] ABSTRACT

Tri- and dichlorosilanes formed by hydrogenation in the course of the reaction of metallurgical silicon, hydrogen and recycle silicon tetrachloride are employed as feed into a separation column arrangement of sequential separation columns and redistribution reactors which processes the feed into ultrahigh purity silane and recycle silicon tetrachloride. A slip stream is removed from the bottom of two sequential columns and added to the recycle silicon tetrachloride process stream causing impurities in the slip streams to be subjected to reactions in the hydrogenation step whereby waste materials can be formed and readily separated.

7 Claims, 4 Drawing Figures

PROCESS FOR THE PRODUCTION OF ULTRAHIGH PURITY SILANE WITH RECYCLE FROM SEPARATION COLUMNS

STATEMENT

The invention described herein was made in the performance of work under NASA Contract Number NAS 7-100, JPL No. 954334, for high purity silicon, and is subject to the provisions of Section 305 of the National Aeronautics and Space Act of 1958 (72 Stat. 435; 42 U.S.C. 2457).

BACKGROUND OF THE INVENTION

1. Field of the Invention

The invention relates to the production of ultrahigh purity silane and silicon. More particularly, it relates to an improved process for ensuring the removal of impurities, e.g., metal hydrides, to levels required for such production.

2. Description of the Prior Art

The development of new techniques for the utilization of non-polluting sources of energy is of paramount national and world-wide interest. Solar energy is among the energy sources of greatest interest because of its non-polluting nature and its abundant, non-diminishing availability. One approach to the utilization of solar energy involves the conversion of solar energy into electricity by means of the photovoltaic effect upon the absorption of sunlight by solar cells.

Silicon solar cells, the most commonly employed devices based on the photovoltaic effect, have been employed reliably in space craft applications for many years. For such applications and for industrial and commercial applications in general, crystals of ultrahigh purity, semiconductor grade silicon are commonly employed. Such high purity, high perfection silicon is generally prepared by procedures involving converting metallurgical grade silicon to trichlorosilane, which is then reduced to produce polycrystalline, semiconductor grade silicon from which single crystals can be grown. The costs associated with the production of such high purity, high perfection crystals are high.

The economic feasibility of utilizing solar cell technology for significant portions of the present and prospective needs for replenishable, non-polluting energy sources would be enhanced if the overall cost of producing single crystal wafers of requisite purity could be reduced. A major area of interest, in this regard, relates to the development of a low-cost, continuous process for the production of high purity polycrystalline silicon from metallurgical grade silicon. The need for such low-cost, high purity silicon is increased by the continued expansion of the utilization of solid-state electronic devices. While the purity requirements for solar grade silicon are not as stringent as for semi-conductor or electronic applications, the highest purity silicon material available at economically feasible costs can be effectively utilized for either solar cell or electronic applications.

The initial step of converting metallurgical silicon to trichlorosilane has commonly been carried out by reacting metallurgical grade silicon with HCl in a fluid bed reaction zone at about 300° C. Trichlorosilane comprises about 85% of the resulting reaction mixture, which also contains silicon tetrachloride, dichlorosilane, polysilanes and metal halides. While this technique has been employed successfully in commercial practice, it requires the use of relatively large reaction vessels and the consumption of excess quantities of metallurgical silicon. In addition, the reaction mixture is relatively difficult to handle and has associated waste disposal problems that contribute to the cost of the overall operation.

In producing high purity polycrystalline silicon from trichlorosilane, current commercial technology is a low volume, batch operation generally referred to as the Siemens process. This technology is carried out in the controlled atmosphere of a quartz bell jar reactor that contains silicon rods electrically heated to about 1100° C. The chlorosilane, in concentrations of less than 10% in hydrogen, is fed to the reactor under conditions of gas flow rate, composition, silicon rod temperature and bell jar temperature adjusted so as to promote the heterogeneous decomposition of the chlorosilane on the substrate rod surfaces. A general description of the Siemens type process can be found in the Dietze et al. patent, U.S. Pat. No. 3,979,490.

Polycrystalline semiconductor grade silicon made from metallurgical grade silicon costing about $0.50/lb. will, as a result of the cost of such processing, presently cost on the order of about $30/lb. and up. In growing a single crystal from this semiconductor grade material, the ends of the single crystal ingot are cut off, and the ingot is sawed, etched and polished to produce polished wafers for solar cell application, with mechanical breakage and electronic imperfection reducing the amount of useable material obtained. As a result, less than 20% of the original polycrystalline, semiconductor grade silicon will generally be recoverable in the form of useable wafers of single crystal material. The overall cost of such useable material is, accordingly, presently on the order of about $300/lb. and up. Because of the relatively large area requirements involved in solar cell applications, such material costs are a significant factor in the overall economics of such applications.

Development efforts to improve high purity silicon technology involve all aspects of the conversion of low-cost metallurgical grade silicon to the presently high cost, high purity silicon product, particularly to means for achieving requisite purity at an economically attractive cost. One aspect of such development work is directed to a process for the production of high purity silane from which silicon can be produced on a continuous basis as hereinafter described. This silane production process involves the hydrogenation of metallurgical grade silicon with hydrogen and silicon tetrachloride to form a gas stream containing trichlorosilane and dichlorosilane. The chlorosilanes are subjected to disproportionation in the presence of an ion exchange resin to progressively replace chlorine molecules with hydrogen molecules so that product high purity silane is eventually recovered from the process and silicon tetrachloride formed during the disproportionation reactions is recycled for further hydrogenation. The process is an integrated one utilizing hydrogen and metallurgical silicon as essentially the only consumed feed materials. The initial tri- and dichlorosilane producton step is preferably carried out at particular elevated pressures and temperatures, substantially enhancing the operation, conversion rate and the production rate obtainable in a given size reaction vessel. Unreacted silicon tetrachloride is conveniently recycled for reaction with additional quantities of hydrogen and metallurgical silicon. Waste disposal is readily accomplished, with material wastage minimized, by condensing a minor portion of unreacted silicon tetrachloride from the trichlorosilane reaction mixture, with said condensed silicon tetrachloride and accompanying impurities being passed to waste without the necessity for dilution prior to hydrolysis previously required during waste disposal.

The high purity silane thus produced can be further purified to remove residual impurities such as trace amounts of monochlorosilane, as required, and may be decomposed on a continuous or semicontinuous basis to produce high purity silicon, e.g., in a fluid reaction zone containing fluidized silicon seed particles or in the hot free space reaction zone of a decomposition reactor. By-product hydrogen produced in the silane decomposition operation can conveniently be recycled to the initial trichlorosilane production step and/or recycled for use as a carrier gas for the silane being decomposed or as a fluidizing gas in the fluid bed silane decomposition operation.

In such improved processing presently under development, the disproportionation reaction zone actually comprises a separation-disproportionation reaction zone in which progressive conversion of the higher chlorosilanes to lower chlorosilanes and to silane occurs, with staged separation until silane is removed as product and silicon tetrachloride is recycled back to the hydrogenation section. The conversion of the tri- and dichlorosilane feed stream from the hydrogenation reaction is accomplished in a combination of distillation columns and redistribution or disproportionation reaction zones. A process arrangement for this purpose was described in the Fourth Quarter, 1977 quarterly Progress Report submitted under the contract referred to above at the beginning of the specification. As described therein, a series of distillation columns is combined with disproportionation reaction zones that process the bottom fraction removed from each distillation column. The high purity silane product is taken from the top of the last distillation column in series, while recycle silicon tetrachloride is taken from the bottom of the first column in series. This process embodiment essentially separates the feedstock into a first trichlorosilane stream, with lighter components as the top draw from the first distillation column, then a dichlorosilane stream, with higher components, as the overhead draw from the second column, then monochlorosilane, and lighter components, as the top draw from the third column, and finally the silane product as the top draw from the last column. The bottom draw from each column is processed through a redistribution or disproportionation reaction zone in order to shift the feed chlorsilane fraction to a range of chlorosilane components as based on chemical equilibrium. This shift or equilibrium redistribution of the chlorosilane feedstock is commonly referred to as disproportionation as this term is used herein. The process stream from each disproportionation reaction zone becomes feedstock for the next preceding distillation column. On an overall basis, this arrangement has the function of processing the initial feedstock comprising primarily trichlorosilane, with minor amounts of lighter chlorosilanes, i.e., dichlorosilane, and silicon tetrachloride such that high purity silane is ultimately removed as product and silicon tetrachloride is recycled for further hydrogenation. Variations of this basic arrangement include the replacement of the final silane purification distillation column with a combined partial condensation and adsorption purification step. The partial condensation produces a high silane content vapor fraction and a liquid fraction containing primarily the lighter chlorosilanes. The liquid fraction can be processed in a redistribution reactor for recycle, whereas the vapor fraction is further purified in the adsorption step. Such purification step could conveniently operate carbon beds on a thermal swing cycle to produce an ultrahigh purity silane product and a bottoms stream for recycle.

The improved process as above described conveniently enables each lower boiling fraction to be separated from the mixture and passed to the following column, with the bottoms of each column being processed through a disproportionation reaction zone for recycle to the previous column. While such a process arrangement is very workable, it nevertheless requires essentially a paired column and disproportionation reactor for each chlorosilane component. Simplification and reduction of necessary processing equipment is always desired as part of the overall effort to reduce the cost of silicon and enhance the technical and economic feasibility of utilizing low-cost, high purity silicon for practical commercial solar cell and electronic applications.

The improved process arrangement also has a potential disadvantage related to the entrapment of impurities in recycle loops between columns, e.g., impurities at a relative volatility between dichlorosilane and silane such as the diborane ($B_2H_6$) or phosphorous hydride ($PH_3$) and impurities at an intermediate volatility between trichlorosilane and dichlorosilane such as boron chloride ($BCl_3$).

The above-noted type of impurities present in the trichlorsilane-containing gas stream passed from the initial metallurgical silicon hydrogenation step, and not removed in the preliminary silicon tetrachloride condensation step referred to above, can generally be removed upon contact with the ion exchange resin employed in the disproportionation zone. However, since any chemical reaction or separation process can never be absolute and since the separation process involves recycle loops, it is a real possibility that a small impurity concentration could build up over an extended period of operating time. Such a buildup would then either impact on the silane product specification or overload the separation column system.

It is an object of the present invention to provide an improved silane process as part of a high grade silicon production process.

It is another object of the present invention to provide a column impurity control feature for the silane process to prevent trapping and buildup of intermediate volatility impurities within process recycle streams between adjacent columns.

It is another object of the present invention to provide bleed streams from the final two separation columns in the redistribution reactor and separation column section of the ultrahigh purity silicon production process to remove impurities that may build up within those process recycle loops.

It is another object of the present invention to remove slip streams from the bottom of the two separation columns and add those streams to the recycle silicon tetrachloride process streams in order to subject contained impurities to the waste removal reactions within the hydrogenation section of the silane process.

It is another object to remove slip streams from the two columns in the separation train in such a manner that the operation of those columns or other parts of the system are not subjected to upset or overload conditions.

SUMMARY OF THE INVENTION

The invention concerns an improvement in the redistribution reactor and separation column section of an ultrahigh purity silicon production process. The mid-section of the process involves a reactor and column combination that processes chlorosilane feed into an ultrahigh purity silane product and a recycle silicon tetrachloride process stream. The column arrangement includes three sequential columns with the first column producing a bottom fraction as the recycle silicon tetrachloride, the last column producing a top fraction as the silane product and the middle column splitting a chlorosilane feed from the top of the first column. Both the top and bottom fractions of the middle column separation are processed by redistribution reactors containing a suitable resin catalyst in order to produce a range of chlorosilane components according to existing equilibrium conditions. The redistributed top stream of the middle column is then fed to the last silane column whereas the redistributed bottom stream is recycled to the first separation column. The bottom stream from the last silane purification column is recycled to the middle column.

The aforesaid redistribution reactor and separation column arrangement involves recycle between the last and middle column and between the middle and the first column. Such recycle loops involve the possibility of trapping intermediate volatility impurities within each recycle loop. Without some means of removing the impurities from the recycle loops, the impurity level could eventually build to the point of either contaminating the silane product or overloading the separation column system (to drive the impurity to the silicon tetrachloride). This invention concerns withdrawal of a small process bleed or slip streams from the bottom of the two sequential columns and adding those slip streams to the recycle silicon tetrachloride process stream. This arrangement allows the removal of any intermediate volatility impurities that may exist and thereby enhances the high purity capability of the silane process.

It should be noted that the above-described process arrangement for the mid-section of the silicon production process is the same as that previously disclosed in co-pending U.S. patent application Ser. No. 062,755 "Ultrahigh Purity Silane and Silicon Production" filed Aug. 1, 1979. Each column of the arrangement involves separation of a multicomponent mixture, but is keyed to a binary pair to facilitate the desired separation. On that basis, the last column with the function of producing the ultrahigh purity silane is keyed to silane as the light component and diborane impurity as the heavy component. The middle column, which produces the feed streams for the redistribution reactors is keyed to dichlorosilane as the light component and trichlorosilane as the heavy component. The first column processing the chlorosilane feed stock is keyed to trichlorosilane as the light component and silicon tetrachloride as the heavy component. As noted, the bottoms of each column are recycled to the previous column. Hence, the recycle loop between the last and middle column can trap impurities at a relative volatility between dichlorosilane and silane such as the diborane ($B_2H_6$) or phosphorous hydride ($PH_3$). On the other hand, the recycle loop between the first and middle column can trap impurities at an intermediate volatility between trichlorosilane and dichlorosilane such as boron chloride ($BCl_3$). The slip streams from the bottom of the last and middle columns serve to remove such impurities from the column recycle loops. The process bleed streams are added to the silicon tetrachloride recycle so that the contained impurities may pass through the hydrogenation reaction section waste removal. Within the hydrogenation reactor and associated waste settler tank, the impurities may be converted to insoluble chemical complexes that settle and are removed with the heavy waste stream. On the other hand, the light wastes that do not form heavy components that can be removed in the waste settler tank pass through the system and are then removed in the stripper column upstream of the three primary columns discussed above.

Although the slip stream from the last column could be processed directly by the stripper column for removal of the light waste components, it is preferred to recycle the stream to the silicon tetrachloride process stream to minimize upset or overload conditions on the stripper column. By addition of small slip stream to the large recycle stream, process condition variations are minimized and additionally all impurities are exposed to the chemical complexing and settling operations that can occur in the hydrogenation section. Hence, such recycle to the silicon tetrachloride system is the preferred method of operation.

BRIEF DESCRIPTION OF THE DRAWINGS

The invention is further described with reference to the accompanying drawings in which.

DETAILED DESCRIPTION OF THE INVENTION

Figure 1:
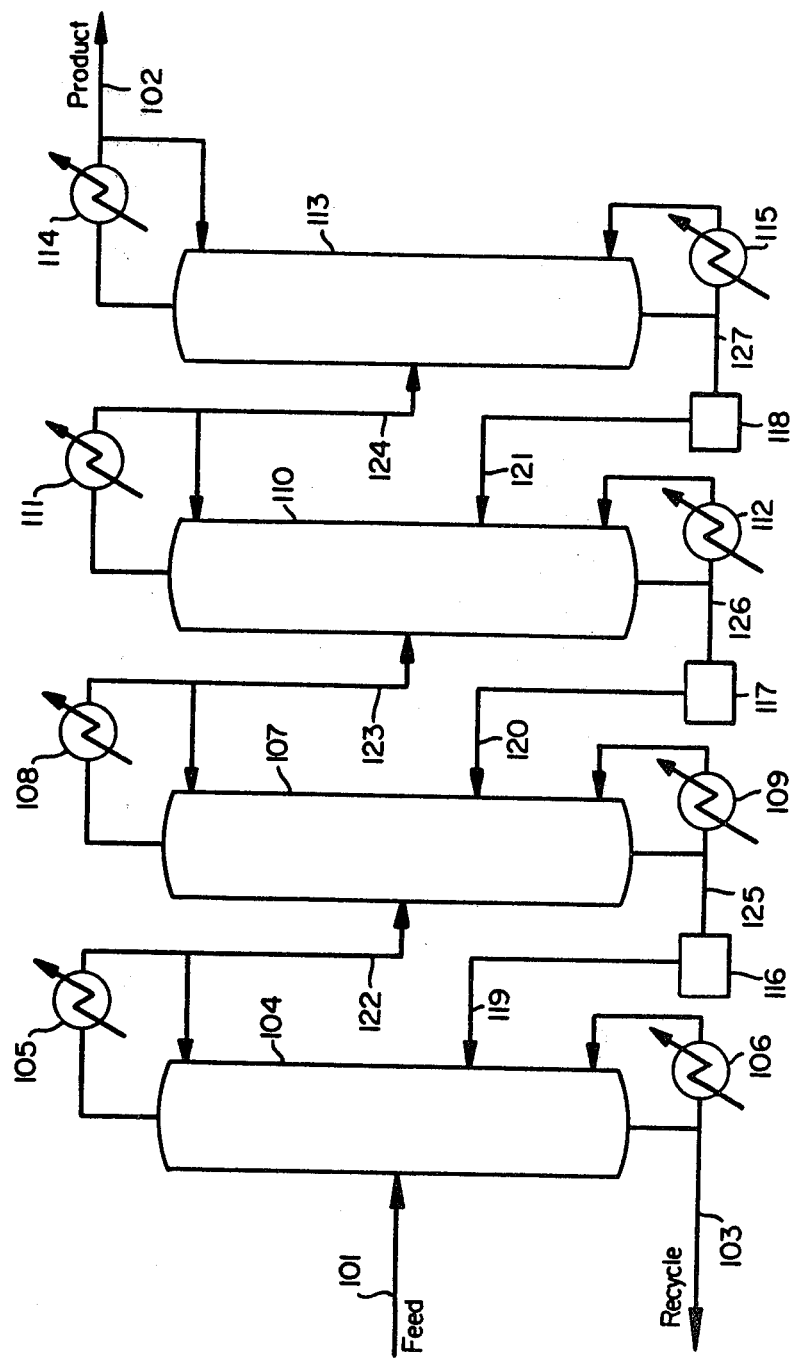
FIG. 1 illustrates a known process for the production of high purity silane by the disproportionation of chlorosilanes.

The process of the invention is herein described and claimed with reference to an integrated process capable of producing ultrahigh purity silane or silicon from metallurgical grade silicon. The invention ensures the capability of achieving the low impurity levels required for the production of ultrahigh purity material. The overall process includes (1) the production of trichlorosilane from metallurgical silicon and hydrogen in a hydrogenation reactor section, (2) the disproportionation of the trichlorosilane containing gas stream to produce high purity silane in a redistribution reactor and separation section, and (3) the conversion of said silane to high purity silicon, if desired, in a pyrolysis section. The integrated process effectively recycles unreacted and by-product materials, minimizing material wastage and simplifying waste disposal operations. The present invention ensures the effective removal of impurities entrapped in the recycle loops of the columns in the redistribution reactor and separation section.

The present invention can advantageously be employed in the conversion of the conventional metallurgical grade silicon materials available in the art to desired high ultrahigh purity silane or silicon. Metallurgical grade silicon, as referred to herein, is a grade of silicon having a resistivity generally on the order of about 0.005 ohm-cm and up to about 3% iron, 0.75% aluminum, 0.5% calcium and other impurities normally found in silicon produced by the carbothermic reduction of silica. It is also within the scope of the invention to employ a ferro-silicon material containing at least about 90% Si and up to 10% or more of iron. It will also be understood by those skilled in the art that suitable grades of ferro-silicon material are included within the meaning of the term "metallurgical silicon," as used herein. It will also be understood that particular grades of metallurgical silicon containing unusual concentrations of certain specific impurities, perhaps for example 1% or more of lead, may not be suitable feed material for the process.

Metallurgical grade silicon or ferrosilicon is processed, in accordance with preferred integrated process, to produce an initial reaction mixture of di- and trichlorosilane by a technique that enables the overall process to be carried out in an economically advantageous manner, with the desirable by-product recycle and simplified waste disposal referred to herein. As silicon tetrachloride separated from the reaction mixture can readily be recycled for reaction with additional quantities of metallurgical silicon and hydrogen, high purity silane is produced with said metallurgical silicon and hydrogen being essentially the only major consumed feed materials.

In this process, metallurgical silicon is intially reacted with hydrogen and silicon tetrachloride in a reaction zone maintained at a temperature of from about 400° C. to about 600° C. and at a pressure preferably in excess of about 100 psi to form trichlorosilane as follows:

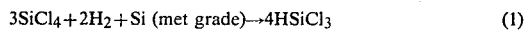

$$3SiCl_4 + 2H_2 + Si \text{ (met grade)} \rightarrow 4HSiCl_3 \quad (1)$$

with the reaction (1) mixture containing a yield of about 20–30% by weight trichlorosilane on a hydrogen-free basis, and of about 0.5% dichlorosilane with the remainder being silicon tetrachloride together with impurities comprising mainly carryover metallurgical silicon powder, metal halides and other impurities essentially without undesired polysilanes.

The above-noted elevated pressures and temperatures in the reaction zone substantially enhance the operation and production rate obtainable in a given sized reaction vessel and the feed conversion rate, thereby reducing the size and operational requirements for reaction vessels and facilitating the overall production operation. The integrated process for the production of high purity silane and high purity silicon, with simplified feed material and reduced material disposal requirements, is of significant advantage in the production of the desired material at an economically feasible cost for practical commercial operations.

The trichlorosilane-containing reaction mixture leaving the reactor zone is desirably cooled to condense a minor portion of the unreacted silicon tetrachloride therein, with said carryover metallurgical silicon, metal halides and other impurities present in said trichlorosilane gas stream separating therefrom the condensed silicon tetrachloride. For this purpose, the trichlorosilane gas stream is passed to a settling zone from which the gas stream passes upward to a condenser unit from which the partially condensed stream is removed. A minor portion of the unreacted silicon tetrachloride, for example on the order of about 5% by weight of the overall silicon tetrachloride in said trichlorosilane gas stream, together with accompanying carryover silicon powder and other impurities is returned to the settling zone from which a waste stream is removed for convenient disposal as the only significant waste stream of the overall integrated process of the invention. Hydrogen gas withdrawn from the condenser unit is recycled for passage with fresh hydrogen to the reactor zone for reaction therein with additional quantities of fresh metallurgical silicon. The trichlorosilane containing gas stream, purified of said impurities and containing said dichlorosilane and the remainder of said silicon tetrachloride, may be subjected to disproportionation by the known process referred to above or, advantageously, by the process of the present invention.

In the known process as shown in FIG. 1, the indicated trichlorosilane-containing gas stream identified by the numeral 101 is converted and separated into a high purity silane product stream 102 and a silicon tetrachloride stream 103 that can be recycled for reaction with additional quantities of metallurgical silicon and hydrogen. The trichlorosilane-containing gas stream first passes to distillation separation column 104 from which a tri- and dichlorosilane-containing gas stream is separated as overhead from unreacted silicon tetrachloride. The separation is driven by the combination of heat addition at the bottom of column 104 by reboiler 106 and heat extraction by reflux condenser 105 at the top of the column. The overhead stream passes in line 122 to a second column 107 that is operated so that said dichlorosilane and any lighter components present are removed in overhead stream 123, while trichlorosilanes and heaviers are removed from the bottom of column 107, which is driven by reboiler 109 and reflux condenser 108 and with appropriate heat addition at the bottom and cooling at the top of the column. The bottoms draw of column 107 is processed through disproportionation reaction zone 116 containing ion exchange resin that catalyzes the disproportionation or redistribution of the trichlorosilane in stream 125 to form a spectrum of chlorosilanes including dichlorosilane and silicon tetrachloride together with remaining trichlorosilane as determined by equilibrium considerations. The disproportionation reaction mixture leaving reaction zone 116 passes through line 119 for reintroduction into column 104 as a feed for the initial separation between trichlorosilane and lighter materials from silicon tetrachloride to be recycled.

Overhead stream 123 from column 107 passes to column 110, the third column in the processing arrangement, wherein monochlorosilane is removed as overhead stream 124 and dichlorosilane and heavier materials are removed as the bottoms draw 126. Column 110 is similarly driven by reboiler 112 and reflux condenser 111. The dichlorosilane-containing bottom stream in line 126 passes to disproportionation reaction zone 117 in which dichlorosilane is redistributed to monochlorosilane and trichlorosilane according to equilibrium considerations. The reaction mixture from zone 117 is fed to previous column 107 through line 120.

Overhead stream 124 from column 110 passes to the final column in the processing arrangement, namely column 113. This column is used to separate product silane as overhead in line 102 from any remaining heavier components that are removed from column 113 as bottom stream 127. Column 113 employs reboiler 115 and reflux condenser 114, with said overhead product silane stream 102 constituting a portion of the stream from the top reflux condenser 114. The heavy bottom stream 127 is passed to third disproportionation reaction zone 118 in which monochlorosilane is redistributed to silane and dichlorosilane. The reaction mixture from said reaction zone 118 passes to the next preceding column 110 through line 121.

The known process thus provides for disproportionation of the bottoms streams removed from the last three distillation separation columns, with said bottoms streams contacting ion exchange resin in each of the three separate disproportionation reaction zones. As a result of this processing arrangement, lighter materials are progressively increased in concentration in the overhead product, and heavier materials are thus increased in concentration in the bottoms. High purity silane is thus recovered as the final overhead product 102 and silicon tetrachloride is recycled in line 103 for use in the hydrogenation of additional quantities of metallurgical grade silicon in the overall integrated process for producing silane from said metallurgical silicon. As noted above, various process modifications can be employed in said known process, as by replacing the final silane purification column with appropriate adsorption beds to yield a high purity silane product that can be passed to a silane decomposition zone for the formation of a high purity silicon product useful for solar cell and other silicon applications. Impurities desorbed from such adsorption beds, as for example by a suitable thermal swing adsorption cycle, can be recycled back to the third column. Since the separation occurring in the third column is between relatively light components with a wide range of boiling points, it is possible to substitute a partial condenser for said third column so that progressive cooling of the silane-rich stream would condense substantial amounts of the dichlorosilane and almost all of the monochlorosilane, so as to leave silane primarily as the feed to the adsorption beds. The condensed fraction can then be recycled for treatment in an appropriate disproportionation reaction zone.

The known process and such variations thereof all involve the progressive separation of higher components as overhead and the successive treatment of the heavier fractions in disproportionation reaction zones. High purity silane is conveniently and effectively produced thereby. In its basic form, the process has the disadvantage of utilizing considerable equipment, with essentially a separation column or zone and a disproportionation reaction zone employed for each separate level of chlorosilane component. In addition, the basic process and its variations all share an important drawback that precludes the effective removal of impurities entrapped in the recycle loops of the columns of the redistribution reactor and separation portion. As discussed above, such ultrahigh purity is required for electronic applications in which very stringent limitations on the boron impurity level of the silicon pertain and is desirable in silicon for solar cell applications if compatible with the cost restraints applicable for practical commercial solar cell applications.

In this regard, it should be noted that final column 113 has, as its primary function, the ensuring of an ultrahigh purity silane product. For this purpose, the column can be operated so that the light component removed as overhead would be silane, having a boiling point of $-112°$ C., and said diborane, the lowest boiling electronically active impurity, having a boiling point of $-86°$ C., would be recovered with the bottoms stream from the column, which would be operated as a distillation zone in which the high purity silane is distilled under pressure. Since the above noted impurities subject to entrapment in recycle loops are very detrimental and since stringent purity requirements pertain to ultrahigh purity applications, it is prudent and indeed imperative to utilize redundant process features to ensure the effective removal of impurities to the very low levels required for the production of ultrahigh purity silane and silicon, e.g., less than one part per billion impurity level required for electronic and other ultrahigh purity applications.

Figure 2:
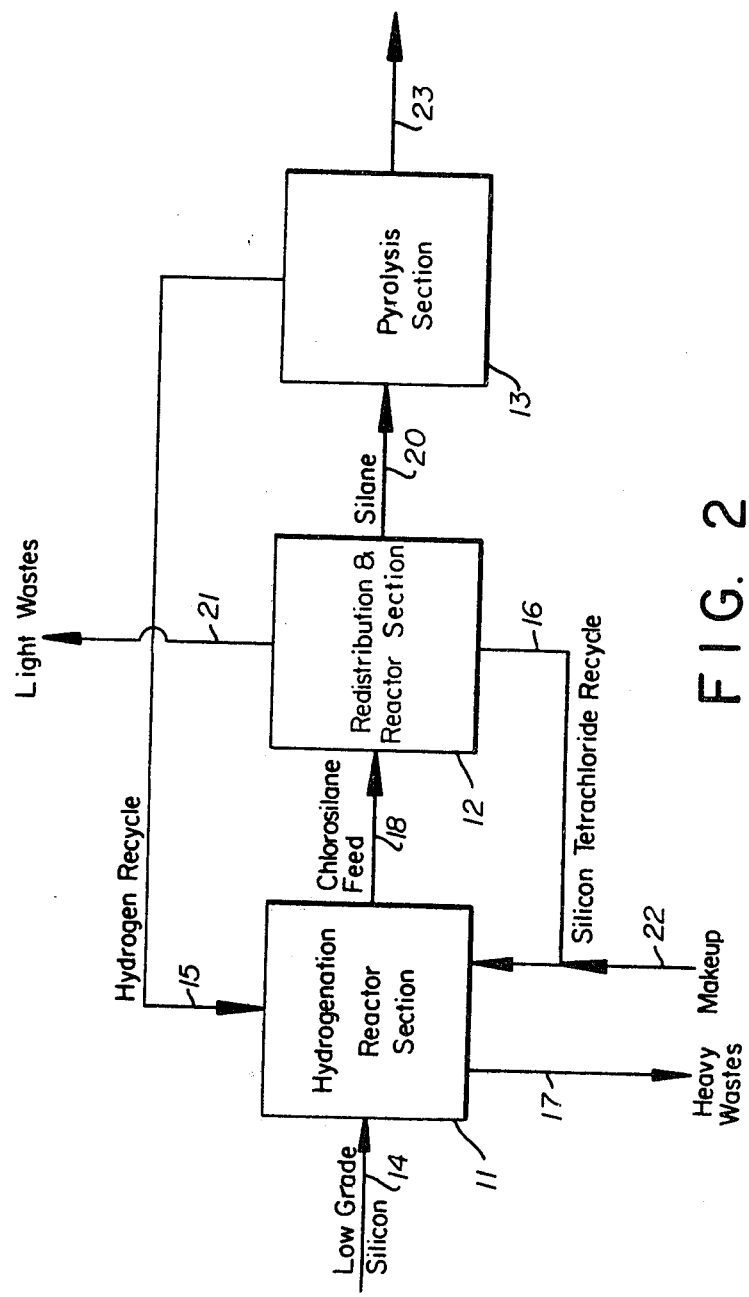
FIG. 2 illustrates the overall process flow employed in the practice of the present invention.

The deficiencies of the known process in this regard are simply and conveniently overcome by the novel and advantageous features of the present invention incorporated in the redistribution and reactor section 12 of FIG. 2 which generally illustrates an overall process for the production of ultrahigh purity silicon. With reference to FIG. 2, the overall process can be thought of as three major subsections including the hydrogenation reactor section 11, the redistribution and reactor section 12 and the silane pyrolysis section 13. The first hydrogenation reaction section involves the reaction of low grade silicon feedstock 14 with hydrogen recycle 15 from the pyrolysis section 13 and silicon tetrachloride recycle 16 from redistribution and reactor section 12 to produce a chlorosilane feed stream 18 and a small waste stream 17. The chlorosilane feed stream 18 containing primarily trichlorosilane and silicon tetrachloride but including also other chlorosilanes is processed in redistribution and reactor section 12 containing a column separation system to produce an ultrapurity silane product 20 and the silicon tetrachloride recycle stream 16. The redistribution and reactor section 12 also includes a means of rejecting light component waste stream 21. The pyrolysis section 13 processes the silane feed 20 to produce the high grade silicon product 23 and the hydrogen recycle 15. As can be seen from the overall process, wastes from the process are rejected at two locations; the first waste removal occurs within the hydrogenation reactor section 11 and results in the removal of a small waste stream 17 which is categorized as the heavy waste fraction. This heavy waste fraction includes solid and liquid wastes which are carried from the process in a relatively small primarily silicon tetrachloride waste stream. The silicon tetrachloride removed from the process by this waste removal step is counterbalanced by a small silicon tetrachloride makeup stream 22 introduced to the recycle process stream. The light waste fraction 21 categorized as dissolved gas impurities such as nitrogen and high volatility waste such as diborane and hydrogen sulfide are removed as the gaseous components of the light waste stream 21. As can be seen from an overall standpoint, the process essentially converts low grade silicon 14 to high grade silicon 20 with only a small makeup stream of silicon tetrachloride depending primarily on the recycle of silicon tetrachloride 16 and hydrogen 15 to the hydrogenation reactor section. All wastes present either in the low grade silicon material or generated by any other of the process steps or introduced by any other equipment processing steps are rejected as a combination of either light wastes 21 (as gases) or heavy wastes 17 (as combined solids/liquid).

Figure 3:
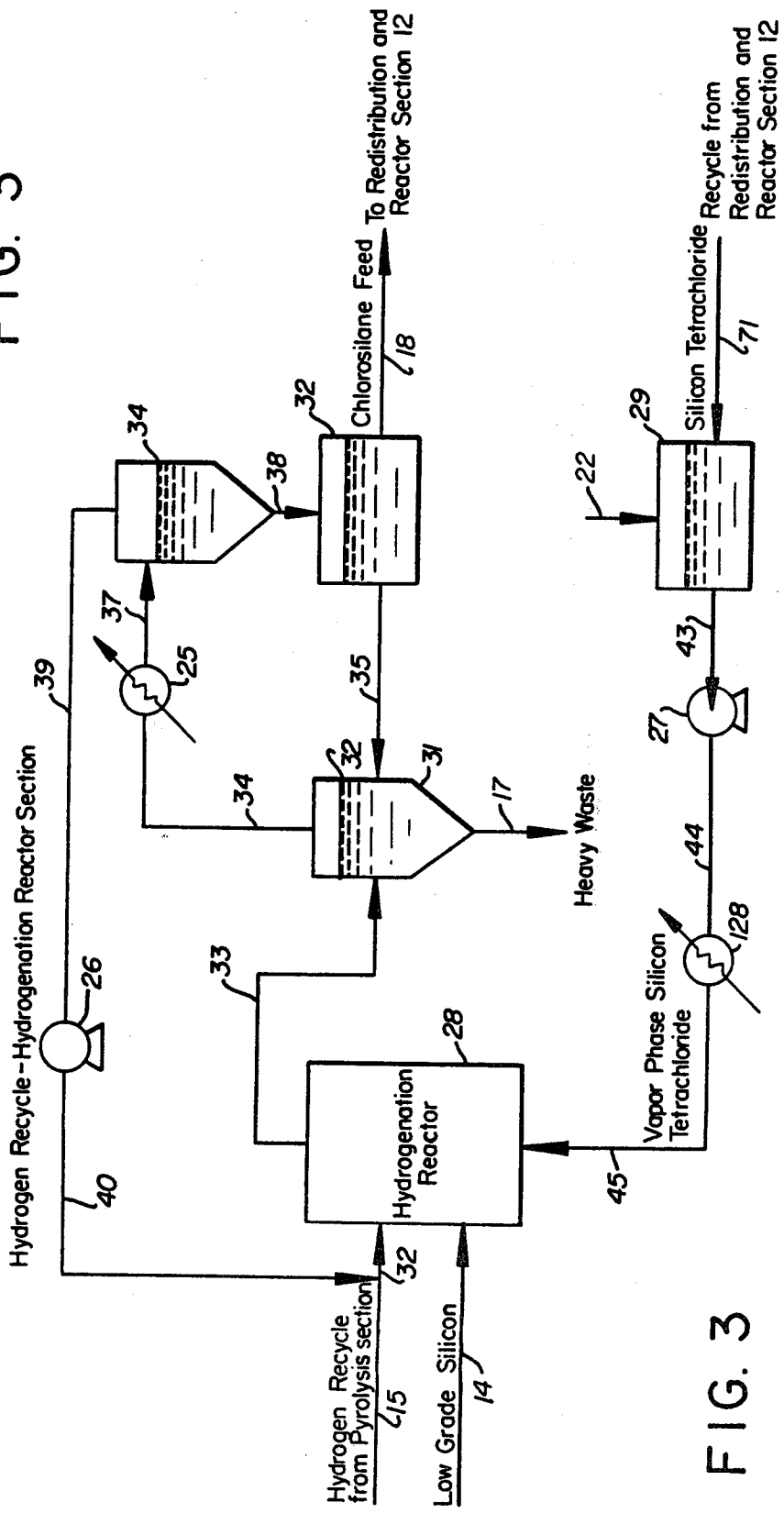
FIG. 3 illustrates a hydrogenation section for the process of the present invention.

In order to further understand the invention, the hydrogenation reactor section 11 is described in additional detail with reference to FIG. 3. On an overall basis, the purpose of this section is to process the silicon tetrachloride recycle stream 16, the low grade silicon feedstock 14 and recycle hydrogen 15 to produce the chlorosilane feed stream 18 and heavy waste liquid stream 17. Although the hydrogenation reactors takes place in the vapor phase, it is desirable to include liquid storage tankage between the hydrogenation and redistribution reactor sections in order to obtain operational flexibility. Accordingly, the liquid recycle silicon tetrachloride 16 is returned to storage tank 29 which also serves to hold makeup silicon tetrachloride 22. The silicon tetrachloride stream is drawn from the storage tank 29 by conduit 43 and pump 27 in order to force the stream through conduit 44. The pressurized liquid stream is vaporized in heater 28 to form vapor phase silicon tetrachloride stream 45 which is then introduced to the hydrogenation reactor 28. The silicon tetrachloride is combined with the silicon feed stock 14 and a hydrogen stream 32 which is actually a combination of hydrogen recycle 15 from a pyrolysis section 13 and hydrogen recycle 40 from the hydrogenation section. Following reaction in hydrogenation reactor 28 which can be catalyzed with appropriate copper catalysts, the reacted stream at pressure and at the elevated temperatures is removed as a hot gas stream 33 containing a combination of unreacted feed streams, chlorosilanes, and various metallic and chloride contaminants. The hot gas is introduced to an appropriate liquid container 31 that has the dual function of cooling the hot gases and separating heavy contaminants from those hot gases. The hot gas stream 33 can be introduced to the upper portion of liquid 32 within the tank so as to cool the gases and remove the contaminants or the hot gases can be quenched with liquid from tank 31 by a suitable pump and high energy venturi contactor (not shown). Within the liquid containing tank 31, contaminants which are a combination of solid and complexed components remain within the liquid phase and tend to settle to the bottom of tank 31. The contaminants include a combination of nonreacted carryover solids, solid catalyst dust, insoluble chemical complexes (primarily metallic chlorides) and dissolved metallic salts. Generally, all these contaminants combine with the liquids (primarily silicon tetrachloride and trichlorosilane) to form a heavy waste sludge. The tank 31 is constructed so as to maintain the quiescent zone at the bottom of the vessel and thereby allow the heavy components to gradually settle to the bottom of tank 31 for eventual withdrawal as a heavy liquid waste stream 17. The cooled, but uncondensed gases, are removed at 34 and passed to an appropriate condenser 25 and the resulting two phase mixture 37 is passed to appropriate separator 34. Separator 34 recovers the cold and primarily hydrogen stream 39 for compression 26 and recycle 40 to the hydrogenation reactor 28. The condensed liquid stream 38 which is primarily a mixture of trichlorosilane and silicon tetrachloride is passed to a liquid storage vessel 32. This liquid storage vessel is the primary reservoir for the chlorosilane feed stream 18 and additionally supplies liquid makeup 35 to the cooling waste settler vessel 31.

Figure 4:
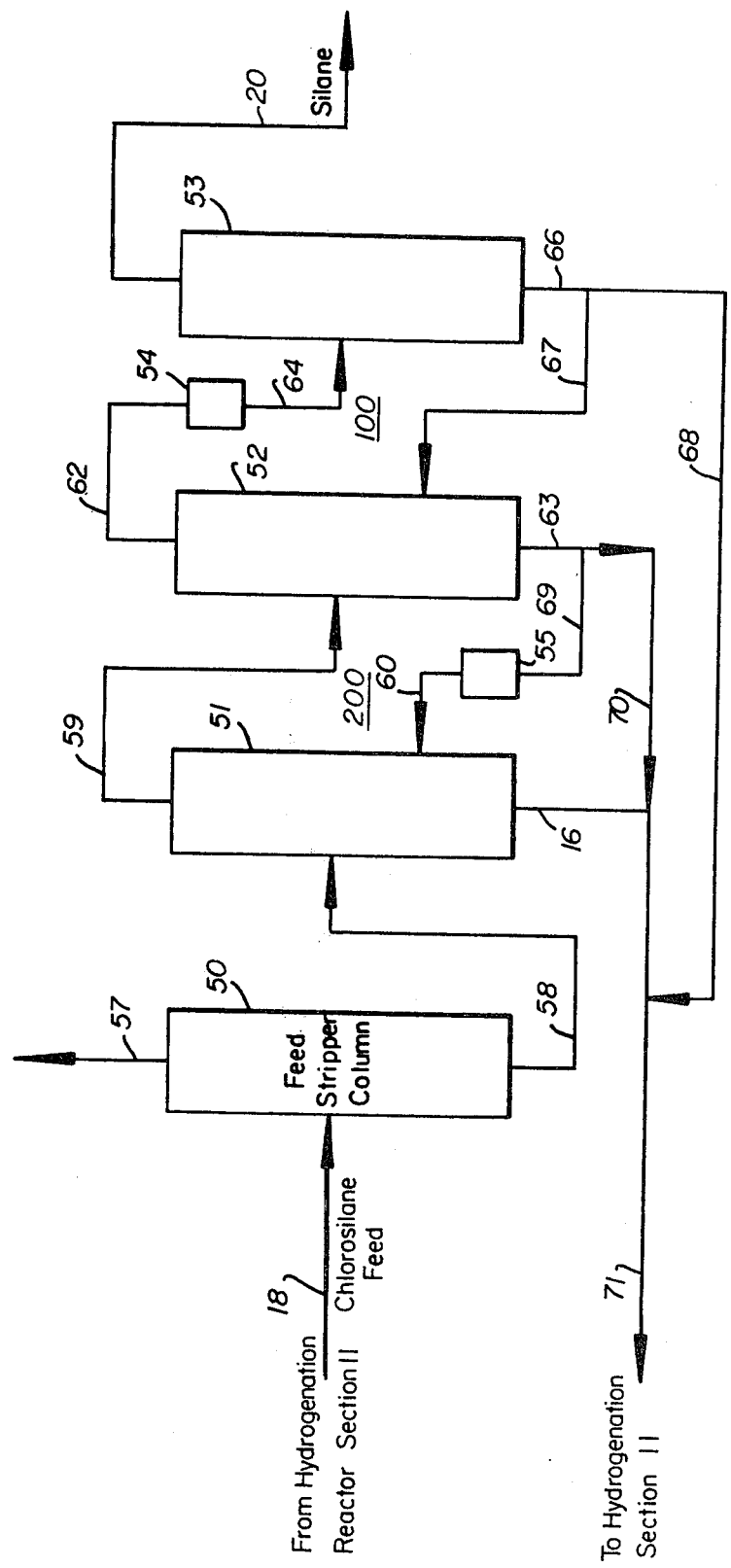
FIG. 4 illustrates a specific embodiment of the present invention.

The redistribution reactor and separation column midsection 12 of the ultrahigh purity silicon production process is shown in detail on attached FIG. 4. The overall function of that section is to process the chlorosilane feed stream 18 to an ultrahigh purity silane product stream 20 and recycle silicon tetrachloride stream 16. This middle section 12 of the process is a combination of appropriate columns and redistribution reactor vessels so that the primarily trichlorosilane and silicon tetrachloride feed 18 is upgraded to silane product 20 and recycle silicon tetrachloride 16. The redistribution reactor and separation section of FIG. 4 includes a series of columns for this processing and includes the particular slip streams utilized for the column impurity control feature embodied in the present invention. The process section of FIG. 2 of the overall process also contains means for removing light waste streams from the overall system. For this purpose, the first column 50 of the system is a stripper column arranged to remove any dissolved gases (such as nitrogen, hydrogen, methane, etc.) contained in the liquid feed stream 18 and any high volatility gas impurities (diborane) which could interfere with the purity of the silane product 20. All of the columns as shown in attached FIG. 4 include appropriate reboilers at the bottom for heat addition and reflux condensers at the top for heat extraction. These reboilers and condensers are not shown for clarity purposes. The first column 50 is operated so as to remove all components of volatility equal to or lighter than hydrogen sulfide as an overhead stream, that is hydrogen sulfide is the light key for the separation whereas dichlorosilane is the heavy key for the separation. Such operation of stripper column 50 ensures that all silicon containing material is retained within the system whereas all light components that may cause degradation of silane purity specifications are removed from the system. The bottom stream from the stripper column 50 are removed as stream 58 and contain primarily trichlorosilane and silicon tetrachloride which is now essentially free of any high volatility contaminants. The next column 51 has as its purpose to make the separation between trichlorosilane as the light key and silicon tetrachloride as the heavy key. The trichlorosilane overhead stream 59 (and all components lighter than trichlorosilane) becomes the feed to the next sequential column 52. The silicon tetrachloride bottom stream 16 (and all components heavier than silicon tetrachloride) is removed as recycle to the hydrogenation reactor as shown in FIG. 3. The middle column 52 is keyed to separate its feed streams into a light fraction which is keyed to dichlorosilane and a heavy fraction keyed to trichlorosilane. The overhead dichlorosilane stream 62 (and all components lighter than dichlorosilane) is processed in the redistribution reactor 54. This redistribution reactor 54 includes a resin catalyst which serves to redistribute the feedstock into a range of components according to equilibrium conditions. The resulting feed stream 64 is then fed to the last column 53. This last column produces the ultrahigh purity silane product 20 as overhead and rejects all other components with bottom stream 66 which is chlorosilane rich and contains residual impurities of the type above-mentioned. Column 53 is operated with silane as the light key and diborane impurity as the heavy key to ensure the ultrahigh purity silane overhead product. The bottoms stream 66 from column 53 are recycled to the previous column as shown by process stream 67. On the other hand, the trichlorosilane-rich bottom stream from column 52 is recycled to the previous column 51 as shown by stream 69. The bottom stream 69 which contains impurities of the above-mentioned types is processed by another redistribution reactor 55 which again serves to redistribute the chlorosilane feed to a spectrum of chlorosilanes according to equilibrium conditions. Following such redistribution, the stream 60 becomes another feed to the first column 51. It is apparent that the bottom recycles 67, 69 of columns 52 and 53 presents a possibility of impurity buildup that cannot be handled unless slip streams 68 and 70 are included as shown in accordance with the present inventions. Column 51 has a light key of trichlorosilane whereas column 52 has a light key of dichlorosilane and column 53 has the light key of the silane product. It is apparent that any impurities of an intermediate volatility between dichlorosilane and silane will be trapped within the recycle loop 100 between column 52 and 53 unless some provision is made to remove such impurity. In a similar fashion, it is apparent that the recycle loop 200 of stream 69 between column 51 and 52 will result in trapping impurities of an intermediate volatility between trichlorosilane and dichlorosilane unless some provision is made to remove such impurity. The addition of slip stream 68 from the last column and slip stream 70 from the middle column is the means provided by the present invention to prevent trapping of impurities within the above-noted recycle loops. Such impurities are added to the silicon tetrachloride recycle stream 16 removed from the first column 51 and then are carried to the hydrogenation section as combined stream 71.

Typical examples of impurities that may get trapped in the recycle loop of the last sequential column 53 include diborane ($B_2H_6$) which is actually the heavy keyed for the separation and phosphorous hydride ($PH_3$) or arsenic hydride ($AsH_3$). On the other hand, typical impurities that could be trapped in the recycle loop between columns 51 and 52 can include boron trichloride ($BCl_3$), phosphorous chloride ($PCl_3$), and arsenic chloride ($AsCl_3$). It should be noted that impurities of this type are removed previous to this column sequence by either the waste removal step associated with the hydrogenation section (as previously described) or by the stripper column 50 upstream of the working columns 51, 52 and 53. However, all actual process separations are not absolutely complete and can bypass at least minor quantity of contaminant. The process recycles associated with the columns 51, 52 and 53 could build the impurity level to the undesirable levels. Also, the process sequence can cause impurity conversions that then lead to buildup in the recycle loops. For example, the metal chlorides ($BCl_3$, $PCl_3$, $AsCl_3$) can pass through the initial columns and become trapped in the recycle loop between the first (51) and middle (52) working columns. Within that recycle loop, the materials are exposed to silane that can cause conversion of some of the impurities to their respective metal hydrides ($B_2H_6$, $PH_3$, $AsH_3$). The resulting hydrides can now be trapped in the recycle loop between the middle (52) and last (53) working columns. Further, the silane process purity specifications are so stringent that it is imperative to allow for multiple impurity removal features to ensure that high purity silane specifications are met at all times. The very high purity specifications of the silane product explain the need for adding the slip streams to recycle stream 71 rather than other possible locations. For example, the slip stream at the bottom of the last column (stream 68) could theoretically be combined with feed stream 18 since it should contain only waste more volatile than dichlorosilane. However, introduction of that slip stream at that point could tend to upset or overload the stripper column 50 on a temporary basis and thereby cause undesired impurity load on the remaining portions of the system. Accordingly, it is considered better to add that slip stream to the recycle silicon tetrachloride 16 since at that point the stream is a very small fraction of the total and will have minor impact on the hydrogenation reactor section 11. At the same time, such arrangement will avoid any change in the stripper column 50 operation. Also, adding the slip streams to the recycle silicon tetrachloride 16 will force the impurities to pass through the hydrogenation reactor 11 whereby all impurities would be subjected to chemical reaction including complexing and settling in the waste settler tank 21 as previously described. Such passage of impurities through the primary reaction of the process would enhance impurity removal compared to recycle through only a subsection of the process.

It should be noted that the slip stream 68 and 70 associated with the column impurity control feature are stream connections intended only to remove minor impurity content of the recycle system. Based on an overall material balance considering expected impurities that can be introduced by the silicon feed stock, makeup streams and tramp impurities from process equipment, it is expected that very small bleed streams would be sufficient to maintain any of the impurities in the column recycle loops below about 1 ppm. It is estimated that a continuous bleed of only 0.01 to 0.1% of the column bottoms recycle stream would be necessary. For example, with reference to FIG. 4, the flowrate of bleed stream 70 can range from 0.01 to 0.1% of the flowrate of bottoms stream 63 (from column 52) and likewise the flowrate of bleed stream 68 can range from 0.01 to 0.1% of the flowrate of bottoms stream 66 (from column 53). Stated alternately, if the flowrate of bottoms streams 63 or 66 is 100 lb.moles/hr. then the flowrate of bleed streams 70 or 68 can range from 0.01 to 0.1 lb.moles/hr. Unless the plant is very large in capacity, it would be preferred to utilize an intermittent bleed sequence so that the removed material would be equivalent to the continuous bleed mode. It is expected that intermittent bleed stream flow rates of 1 to 3% of the bottoms recycle would be acceptable from an operations control and upset standpoint. Such bleed flowrates would thereby require bleed times ranging from 1/10 to 1/300 of plant operating time to correspond to the continuous bleed mode. The periodic operation of the bleed streams (frequency) could occur once every eight hour shift, once a day, or once every week. The bleed duration (time for bleeding the impurities) would depend on the frequency of the bleed operation, but it is expected that the operation would be set up for minimum bleed intervals of about five minutes and maximum intervals of about one hour. The particular conditions of bleed flowrates, frequency and duration will be a function of particular plant conditions as monitored and determined by regular plant checks of impurity levels within the process recycle loops. Since the bleed is combined with the main silicon tetrachloride recycle 16, other components in the recycle loop are not lost to the system, but simply recycled through the system and ultimately are utilized. It should be noted that the intermittent bleed feature may be either done manually by opening and closing appropriate valves in the process lines or could be setup for automatic operation utilizing a timer and associated solenoid valves.

It is again emphasized that the need for this column impurity control feature is associated with two factors. First, any actual chemical reaction or separation process can never be absolute. Thus, although the overall process arrangement is such that there are heavy and light waste removal steps upstream of the redistribution reactor and column separation section, it is possible for some minor impurity concentration to remain in the process streams and carryover into that section. Second, since that section involves recycle loops, it is then possible for that small impurity concentration to build up over an extended operating time period. Such build up over an extended operating time period would then either impact on the silane product specification or overload the separation column system. Thereby the combination of these two factors required provision for removing impurities that may find their way to this section of the process. The removal of the two slip streams 68 and 70 from the silane purification column 53 and the middle column 52 ensures low levels of impurities in the recycle portions of the process. The addition of these slip streams 68 and 70 to the recycle silicon tetrachloride 16 passes the impurities through the entire process train thereby maximizing the likelihood of converting any existing impurities to solid precipitates or complexes that can be removed from the system. At the same time, such arrangement minimizes process condition variations or upsets on the system and enhances the ultrahigh purity characteristics of the overall process.

It is generally known by those skilled in the distillation art that either gas or liquid overhead or bottom draws can be produced by appropriate adjustment of the reboiler/reflux condenser heat duty. While it is preferred that the liquid phase be utilized for all process streams between the columns and the disproportionation reaction zones, it is within the scope of the invention for some said streams to be in the vapor phase. Both the distillation columns and the disproportionation reaction zones can be operated successfully with either the liquid or the vapor phase.

The process as illustrated in FIG. 3 can be operated at essentially constant pressure operation apart from the normal pressure drop for fluid movement from one zone or column to another and across said zones or columns. It is also within the scope of the invention to allow for different pressure operation in each of the distillation columns. This can be accomplished by incorporation of appropriate pumps and valves to either boost the pressure, as desired, or to let down pressure on any transfer streams. The preferred pressure for the three columns is different, with the first column 51 keyed to trichlorosilane as the overhead. This column is preferably operated at about 50 psia, with the desirable range extending as low as 30 and as high as 80 psia. Second column 52, which is keyed to dichlorosilane as overhead, is preferably operated at about 300 psia, with the desirable range being from about 150 to about 350 psia. Third column 53, keyed to the ultrahigh purity silane product, is preferably operated at about 350 psia, with a desirable range of from about 300 to about 400 psia. It is also within the scope of the invention to operate column 53 and reactor zone 54 at pressures as low as about 2 psia, thereby enhancing the separation between silane and diborane. Each column can be driven by appropriate heat addition of the reboiler and heat extraction in the reflux condenser corresponding to the temperatures that correspond to said pressure limits. Normally, the use of low pressure stream for the reboilers will be satisfactory along with cooling water for the reflux condenser, although the final silane column may require the use of lower boiling refrigerant as for the cryogenic separation of ultrahigh purity silane from diborane.

It should also be noted that the temperature and pressure employed in the disproportionation reaction zones are not limited to conditions dependent on the conditions in the intermediate column that supplies feed stocks to said zones. Appropriate pumps and valves can be combined with desired cooling or heating steps to assure that the pressure and temperature conditions for said reaction zones can be adjusted for optimum operation in accordance with established practice.

As indicated above and as known in the art, the disproportionation reaction zones will contain suitable commercially available ion exchange resin capable of catalyzing the disproportionation reaction. Such resin is commonly insoluble, solid anion exchange resin continuing tertiary amino or quaternary ammonium groups bonded to carbon, with such resins that are macroreticular and that contain tertiary amino groups being generally preferred. Such resins, including the commercial macroreticular tertiary amine ion exchange resin produced by Rohm and Haas Company and sold under its Amberlyst A-21 trademark are described in detail in the Bakay patent, U.S. Pat. No. 3,968,199, which also describes the generally known features of the disproportionation reactions. It should be noted that it is generally convenient to employ said resin in an amount generally on the order of about 20 lbs. of resin per lb./hr. of product silane produced in the disproportionation zone. It should also be noted that the disproportionation reactors can be operated in either vapor or liquid phase.

Disproportionation reaction zone 55 is operated in the presence of such ion exchange resin at a temperature capable of causing the disproportionation of trichlorosilane according to reaction (2) as follows:

$$2HSiCl_3 \rightarrow H_2SiCl_2 + SiCl_4 \qquad (2)$$

Disproportionation reaction zone 54 is similarly operated so as to dissociate dichlorosilane according to reactions (3) and (4) below:

$$4H_2SiCl_2 \rightarrow 2H_3SiCl + 2HSiCl_3 \qquad (3)$$

$$2H_3SiCl \rightarrow SiH_4 + H_2SiCl_2 \qquad (4)$$

The silane purity obtained in practical commercial operations of the invention can thus be of exceptional quality for further processing in solar cell and electronic applications.

The overall integrated process of the invention, in its preferred embodiments, advantageously includes the enhanced initial production of trichlorosilane from metallurgical grade silicon. Apart from the inherent advantages of the reaction of metallurgical silicon, hydrogen and silicon tetrachloride, the reaction can be carried out at elevated pressure and temperature levels that substantially enhance the production rate obtainable in the hydrogenation reaction zone. The reaction zone is maintained at a temperature of from about 400° C. to about 600° C., preferably at from about 500° C. to about 550° C. The reaction zone, which may comprise a fluid bed, fixed bed or stirred bed, is maintained at pressures in excess of 100 psi, e.g., from about 300 psi to about 600 psi, preferably about 400 to 600 psi, although even greater yields may be obtained at pressures above 600 psi. Under such conditions, it has been found that the yield of trichlorosilane is significantly improved, said yield being on the order of 15–20% mole % at atmospheric reaction conditions, about 20–25% at 60 psi and over 30% at pressures greater than 100 psi. Larger quantities of the desired trichlorosilane are thus obtainable from smaller size reactors, this feature contributing significantly to the production of low-cost silane and silicon as compared with conventional processing. The production of trichlorosilane by the reaction of metallurgical silicon with HCl at about 300° C., by comparison, requires relatively large reaction vessels and produces a reaction product mixture containing appreciable quantities of polysilane, which results in additional processing costs not encountered in the practice of the present invention.

While not essential, it is desirable to employ a copper catalyst in the hydrogenation reactor zone. For this purpose, metallic copper or a mixture of said metallic copper and copper oxides, such as obtained by conventional copper precipitation processing, can be employed. Metallic copper will generally be employed at about 150 mesh, similar to ground up silicon, with said copper oxides being of fine range, such as about 10 microns in size. $CuCl_2$ is also operable for such purposes. The copper catalyst is employed in an amount within the range of from about 0.1% to about 5% by weight based on the overall weight of metallurgical silicon and said copper catalyst employed in the reaction zone.

The hydrogenation reaction zone constitutes a relatively small first stage of the overall process, utilizing an energy efficient sized reactor having decreased utility costs as compared with those that would be required at lower, more conventional, reaction pressure levels. It should be noted that, although relatively high reaction pressures are employed, such pressures do not require the additional level of construction techniques, complexity and costs encountered in the construction of reaction vessels for operation at pressures greater than 600 psi. The simplified was disposal operations of the invention are accomplished by condensing a minor portion of the unreacted silicon tetrachloride in the trichlorosilane gas stream removed from the reaction zone prior to its passage to the distillation zone in which silicon tetrachloride is separated from di- and trichlorosilane for recycle to the hydrogenation reaction zone. As such recycle is an important aspect of the overall processing advantages inherent in the integrated and improved process, it will be understood by those skilled in the art that the temperatures and pressures are adjusted so that as little silicon tetrachloride as possible is condensed to achieve the desired impurity removal, thereby maximizing the silicon tetrachloride available for recycle. By this convenient means, carryover metallurgical silicon powder, metal halides and other impurities present in the trichlorosilane gas stream from the hydrogenation reaction zone separate therefrom with said condensed silicon tetrachloride. Such impurities include metal halides, and small amounts of copper if such copper catalyst is employed. Because of the absence of appreciable quantities of the more hazardous polysilanes encountered in conventional processing, said unreacted silicon tetrachloride and accompanying silicon powder and impurities can be passed to waste without the necessity of diluting the waste stream with additional silicon tetrachloride prior to hydrolysis thereof during waste disposal.

In the embodiments of the integrated process in which silicon is to be produced, the silane obtained as disclosed above is passed to a silane decomposition zone, represented generally by the numeral 13 in the drawing, in which the silane is decomposed to form high purity or ultrahigh purity polycrystalline silicon and by-product hydrogen according to the following reaction:

$$SiH_4 \rightarrow Si + 2H_2 \qquad (5)$$

The silicon thus obtained can readily be separated from by-product hydrogen and recovered for further refinement or use. In one embodiment, said high purity polycrystalline silicon can be passed, preferably directly, to a melting zone maintained at a temperature above the melting point of silicon, thereby obtaining a high purity, polycrystalline silicon melt from which high purity single crystal silicon can be obtained by known crystal pulling techniques for use in solar cell or electronic applications.

It is desirable to decompose silane on a continuous or semicontinuous basis at relatively high production rates, overcoming the inherent disadvantages and limitations of the Siemens process, utilizing either a free space reactor or a fluidized bed reactor. In the free space reactor approach, high purity polycrystalline powder is conveniently produced by introducing silane into the hot free space of a decomposition zone maintained at a temperature within the decomposition temperature range of the silane and below the melting point temperature of silicon, i.e., from 390° to about 1400° C., preferably from about 800° C. to about 1000° C. As a result of the homogeneous decomposition of the silane within the free space reactor, polycrystalline silicon powder is formed together with by-product hydrogen. The decomposition can be carried out at essentially atmospheric conditions or at elevated pressures up to 100 psi or above, with elevated pressures tending to form higher silicon production rates and the formation of larger particles, which generally range from submicron to low micron size, e.g., $5\mu$. The silane feed gas is preferably introduced into free space zone turbulently, as by injector means positioned at the top of the reactor, with the turbulence tending to minimize heterogeneous decomposition at the reactor wall and consequent silicon wall deposit build up. The silicon powder of high purity, upon discharge from the decomposition reactor, may be consolidated or melted for further processing by conventional means to produce a low-cost, high purity single crystal material. In passing the silicon powder from the settling zone in which it is separated from by-product hydrogen, typically within the reactor itself, the silicon powder can advantageously be passed directly to a melting zone, without outside contact, so as to minimize exposure of the product polycrystalline silicon to sources of potential impurities, thereby assuring the high quality of the product silicon. Alternately, the silicon powder may be passed to a consolidation zone to form larger sized silicon particles for subsequent treatment or use.

In another embodiment of the integrated process, the silane decomposition zone comprises a fluid bed silicon reaction zone. In this embodiment, silane is injected into the reaction chamber containing particles of elemental silicon small enough to be fluidized by the injected silane gas. The fluidized bed of silicon particles are maintained at a temperature within the thermal decomposition range and below the melting point of silicon. By the heterogeneous decomposition of the silane, the desired silicon product is deposited on the fluidized bed particles, which increase in size until removed from the reaction chamber as product. Seed particles for the fluidized bed are formed by the grinding of a portion of the product silicon particles in a manner avoiding the introduction of impurities into said seed particles.

The by-product hydrogen formed upon decomposition of silane in the free space reactor or in a fluid bed reactor can be effectively utilized in the integrated process of the invention. For example, the silane feed to the decomposition zone is advantageously diluted with at least a portion of said by-product hydrogen prior to being introduced into said zone. Likewise, said by-product hydrogen, or at least a portions thereof, can be effectively utilized by being passed to the hydrogenation reaction zone for reaction therein with metallurgical grade silicon and silicon tetrachloride in the initial step of forming the trichlorosilane gas stream from which silane is produced as herein described.

The process of the invention can be employed in the production of silane in accordance with embodiment illustrated in the drawing, with metallurgical grade silicon, hydrogen and silicon tetrachloride being reacted with said silicon and hydrogen being employed in approximately a 1:2 mole ratio. The hydrogen and silicon tetrachloride, employed in a 1:1 mole ratio, can be preheated to 500° C. and pressurized to 325 psig prior to being introduced into the hydrogenation reactor. The trichlorosilane gas stream leaving the reactor is desirably at 500° C. and 300 psig. A condenser unit is employed to condense a portion of the silicon tetrachloride content, i.e., about 5%, said silicon tetrachloride carryover silicon powder and impurities being withdrawn from the system through a settler zone, the waste stream being discharged from the system. One portion of the condenser unit is operated at 25° C. for this purpose, the other portion thereof being operated at about −15° C. with hydrogen thus being recycled at −15° C. The trichlorosilane stream is fed to distillation column 51 at 50 psig, with recycle silicon tetrachloride existing from said column at 124° C. and 50 psig. The di- and trichlorosilane stream removed from column 51 is passed through line 59 to column 52, operated at 310 psia, from which a dichlorosilane-rich overhead stream is removed through line 62 and a trichlorosilane-rich bottom stream is removed through line 69. Each stream is passed to a disproportionation zone, assuring that all of the process fluid passing through the separation-disproportionation portion of the process passes through at least one such zone for contact with ion exchange resin therein. The overhead stream is passed to reaction zone 54, from which the resulting disproportionation reaction mixtures is passed to third column 53 operated at 350 psia. The overhead therefrom is product silane, said column being operated to further ensure that the lowest boiling electronically active impurity, diborane, is separated from product silane. The bottom stream from said column 53 is recycled to intermediate column 52 through line 67.

What is claimed is:

1. In the process for the production of silane from metallurgical grade silicon which process includes the steps of (i) reacting metallurgical grade silicon with hydrogen and silicon tetrachloride at elevated temperature and pressure in a hyddrogenation reaction zone to form trichlorosilane and dichlorosilane; (ii) separating tri- and dichlorosilane as an overhead stream and unreacted silicon tetrachloride as a bottom stream in a first distillation zone; (iii) separating said overhead stream of tri- and dichlorosilane in a second distillation zone to form a dichlorosilane-rich overhead stream and a trichlorosilane-rich bottom stream; (iv) recycling said unreacted silicon tetrachloride bottom stream to said hydrogenation reaction zone; (v) subjecting said dichlorosilane-rich overhead of (iii) to temperature and pressure conditions capable of causing the disproportionation thereof in a first disproportionation reaction zone containing an ion exchange resin capable of catalyzing said disproportionation reaction, thereby forming a mixture of silane and chlorosilanes; (vi) subjecting said trichlorosilane-rich bottom stream of (iii) to temperature and pressure conditions capable of causing the disproportionation thereof in a second disproportionation reaction zone containing an ion exchange resin capable of catalyzing said disproportionation reaction, thereby forming a mixture of chlorosilanes and silicon tetrachloride; (vii) recycling said mixtures of chlorosilanes and silicon tetrachloride of (vi) to said first distillation zone; (viii) separating said mixture of silane and chlorosilanes of (v) in a third distillation zone to form a product silane overhead stream and a chlorosilane-rich bottom stream; (ix) recycling said chlorosilane-rich bottom stream from said third distillation zone to said second distillation zone; and (x) recovering silane product from said third distillation zone, the improvement which comprises bleeding a portion of the trichlorosilane-rich bottom stream of (iii) said bleed portion containing one or more of $BCl_3$, $PCl_3$ and $AsCl_3$ impurities and adding said portion to the unreacted silicon tetrachloride bottom recycle stream of (iv) and bleeding a portion of the chlorosilane-rich bottom stream of (viii) said bleed portion containing one or more of $B_2H_6$, $PH_3$ and $AsH_3$ impurities and adding said portion to the unreacted silicon tetrachloride bottom recycle stream of (iv), wherein the respective bleed portions of the trichlorosilane-rich bottom stream of (iii) and chlorosilane-rich bottom stream of (Viii) are 0.01 to 0.1 percent of their respective bottom streams.

2. The process of claim 1 in which said ion exchange resin comprises a resin containing tertiary amino or quanternary ammonium groups bonded to carbon.

3. The process of claim 1 in which first distillation column is operated at a pressure of from about 30 to about 70 psia, said second column is operated at from about 150 to about 350 psia and said third column is operated at from about 300 to about 400 psia.

4. The process of claim 3 in which said second column is operated at about 310 psia.

5. The process of claim 3 in which said third column is operated at about 350 psia.

6. The process of claim 3 in which said first column is operated at about 50 psia.

7. The process of claim 2 in which said ion exchange resin is macroreticular and contains tertiary amino groups.

* * * * *